J. C. SPARKS.
TRANSMISSION GEARING.
APPLICATION FILED JULY 6, 1912.

1,055,677.

Patented Mar. 11, 1913.

6 SHEETS—SHEET 1.

Witnesses
Byron B. Collins
H. H. Byrne

Inventor
J. C. Sparks,
By
J. A. Mathew
Attorney

J. C. SPARKS.
TRANSMISSION GEARING.
APPLICATION FILED JULY 6, 1912.

1,055,677.

Patented Mar. 11, 1913.
6 SHEETS—SHEET 2.

Witnesses
Byron B. Collings
H. H. Byrne

Inventor
J. C. Sparks,
by J. A. Matthews
Attorney

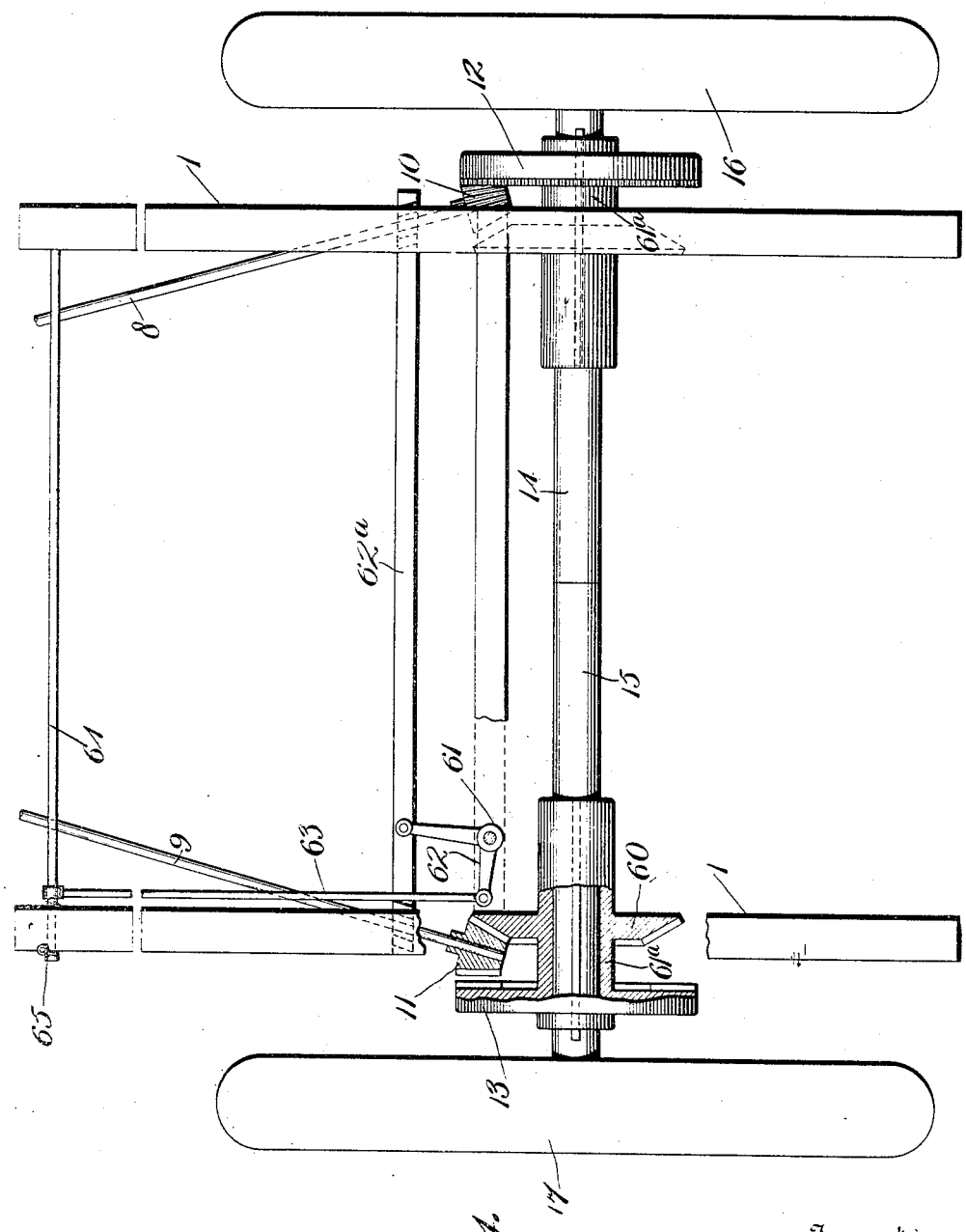

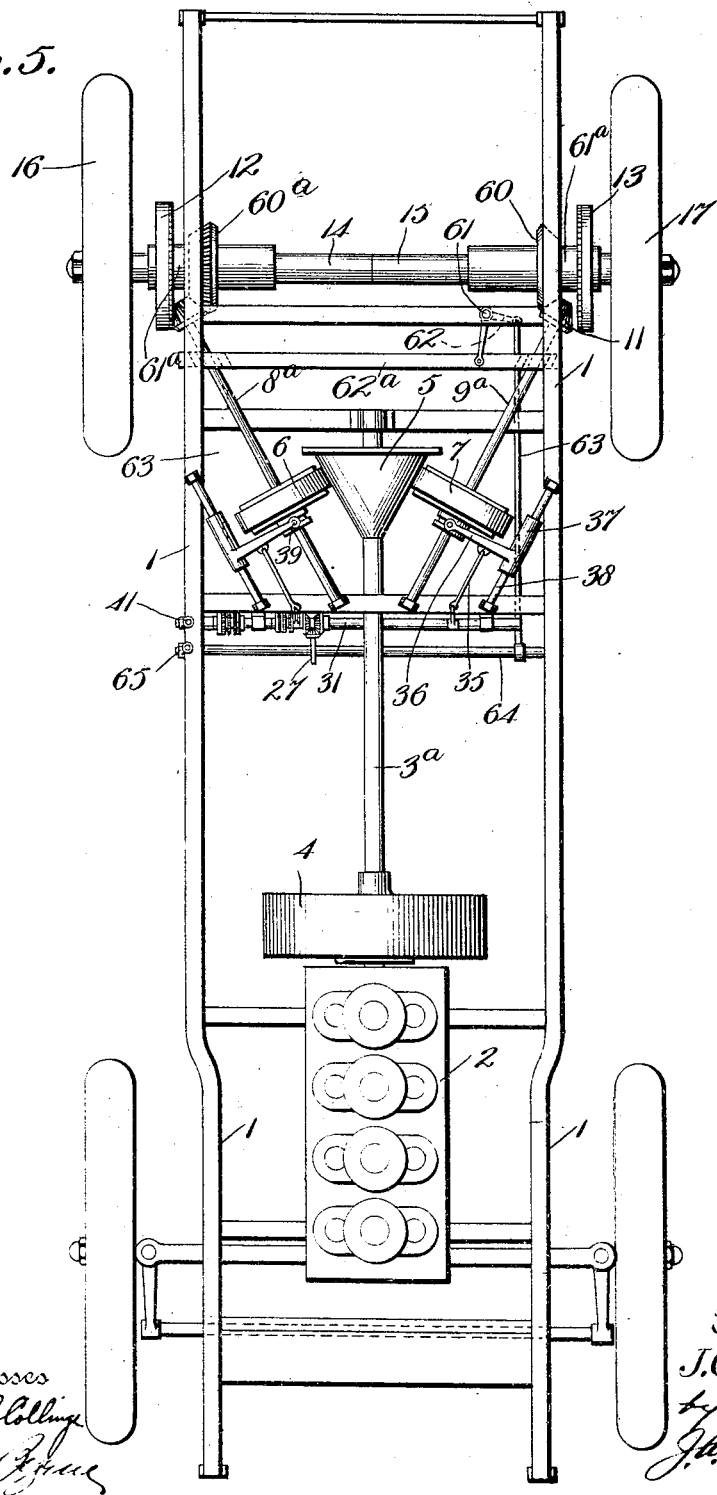

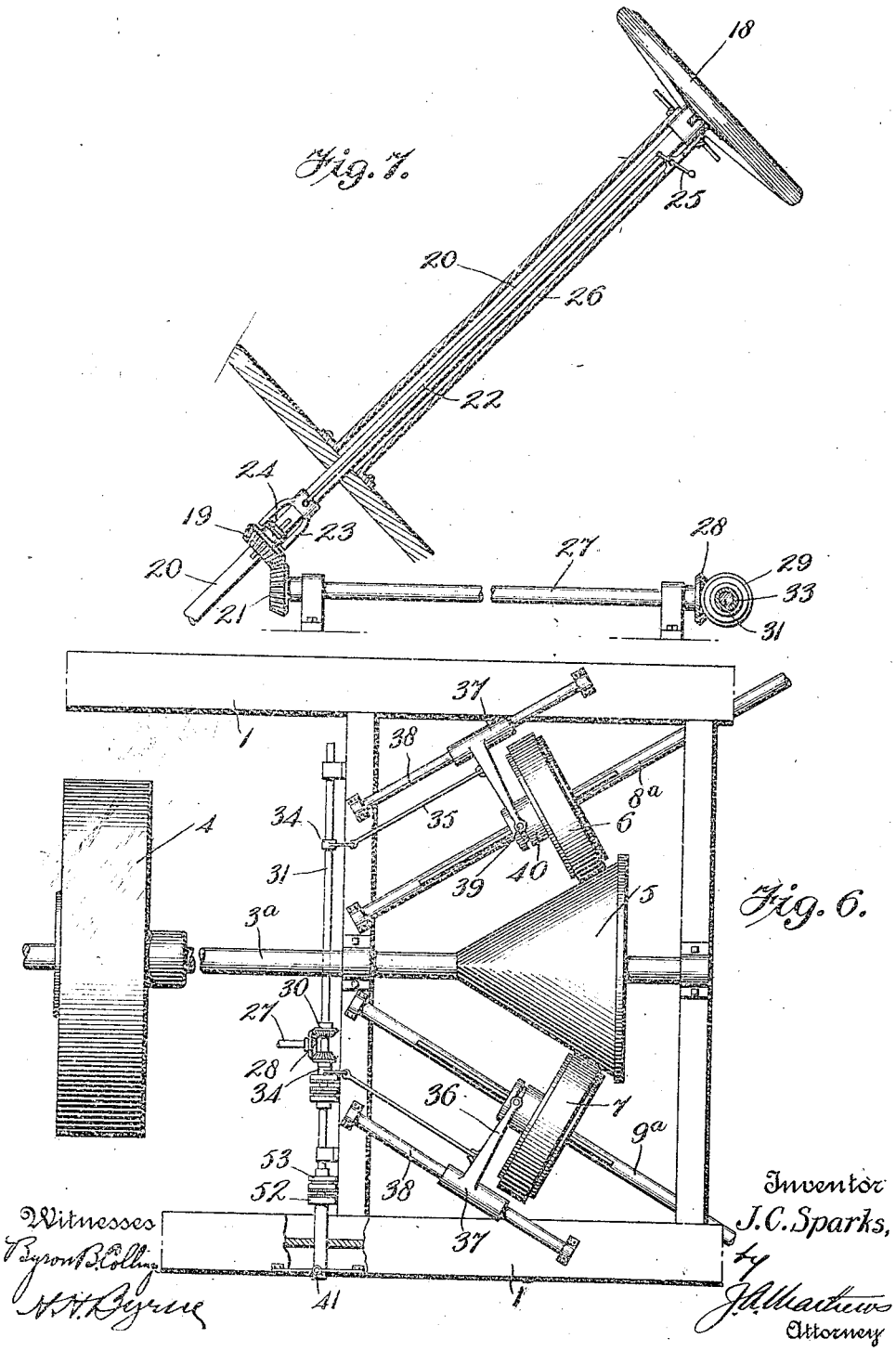

J. C. SPARKS.
TRANSMISSION GEARING.
APPLICATION FILED JULY 6, 1912.
1,055,677.
Patented Mar. 11, 1913.
6 SHEETS—SHEET 6.
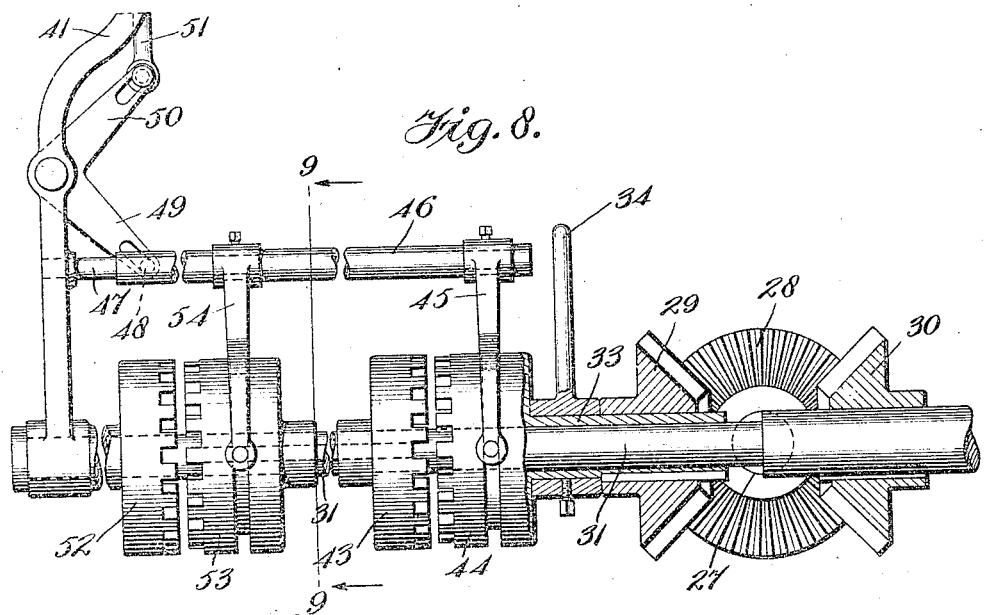
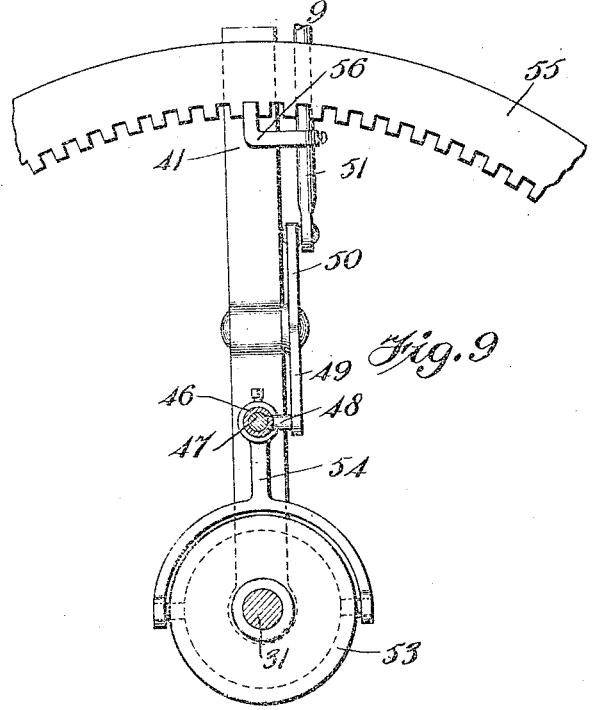
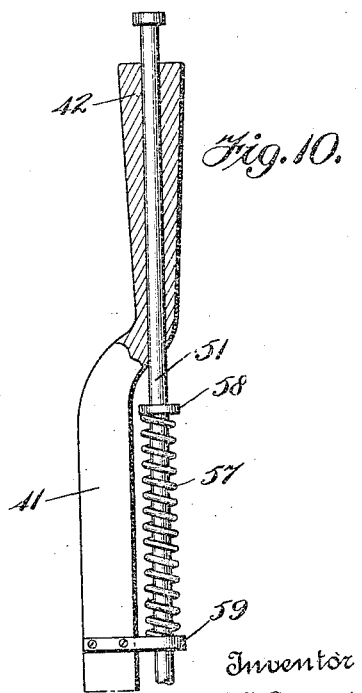
Inventor
J. C. Sparks,
Witnesses

UNITED STATES PATENT OFFICE.

JASON C. SPARKS, OF CONCORD, NEBRASKA.

TRANSMISSION-GEARING.

1,055,677.

Specification of Letters Patent. Patented Mar. 11, 1913.

Application filed July 6, 1912. Serial No. 708,076.

*To all whom it may concern:*

Be it known that I, JASON C. SPARKS, a citizen of the United States, residing at Concord, in the county of Dixon and State of Nebraska, have invented certain new and useful Improvements in Transmission-Gearing, of which the following is a specification.

The present invention relates to transmission gearing for motor-driven vehicles, and has for its purpose to provide a system of transmission gearing for automobiles or similar power-driven vehicles whereby the driven wheels of the rear axle may be rotated at speeds commensurate with the degree of turning which the vehicle may take; and wherein such differential driving may be controlled automatically through the operation of the steering gear of the car.

Another object of the invention consists in having a transmission gearing of the above-mentioned type with means associated therewith for effecting the reverse drive of the vehicle without reversing the engine; and it is further proposed that the entire system and its manner of arrangement and operation may be of simple construction, easily operated, and inexpensive to produce.

Figure 1:
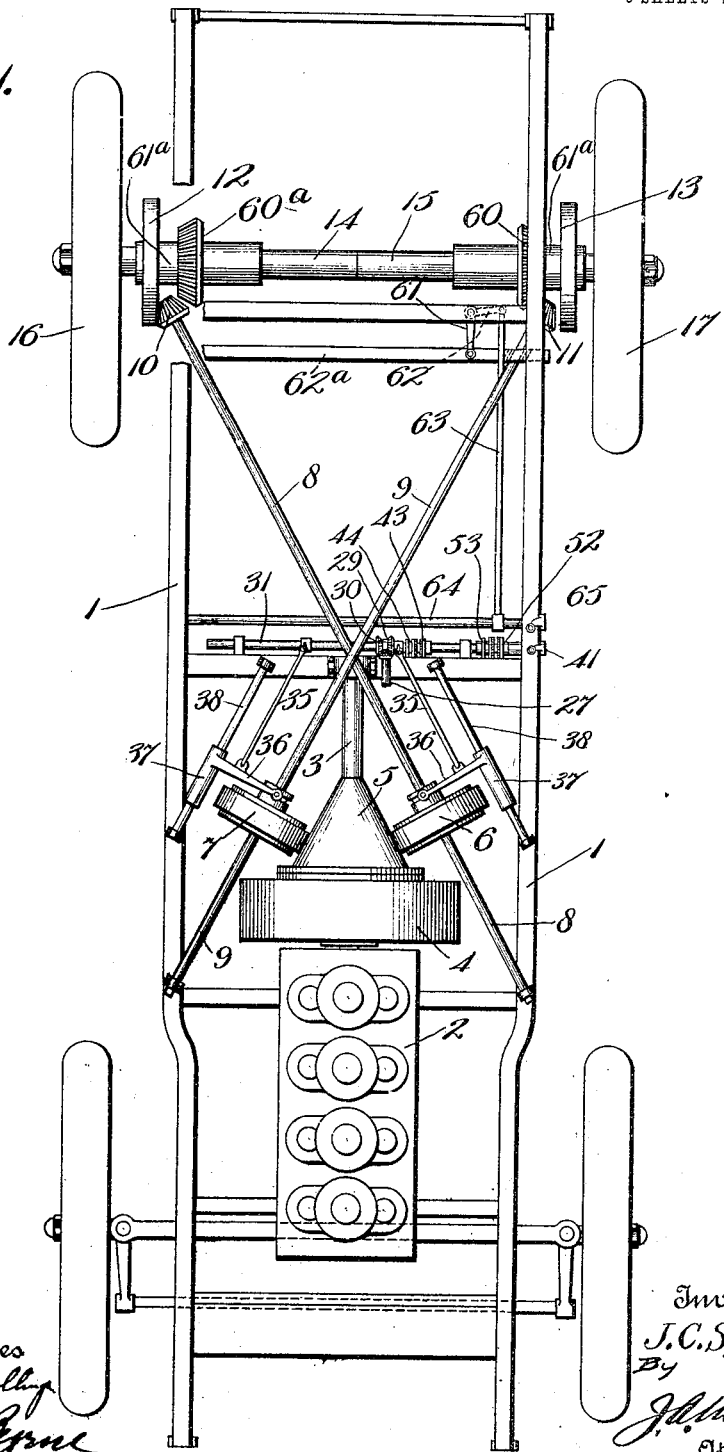
Figure 2:
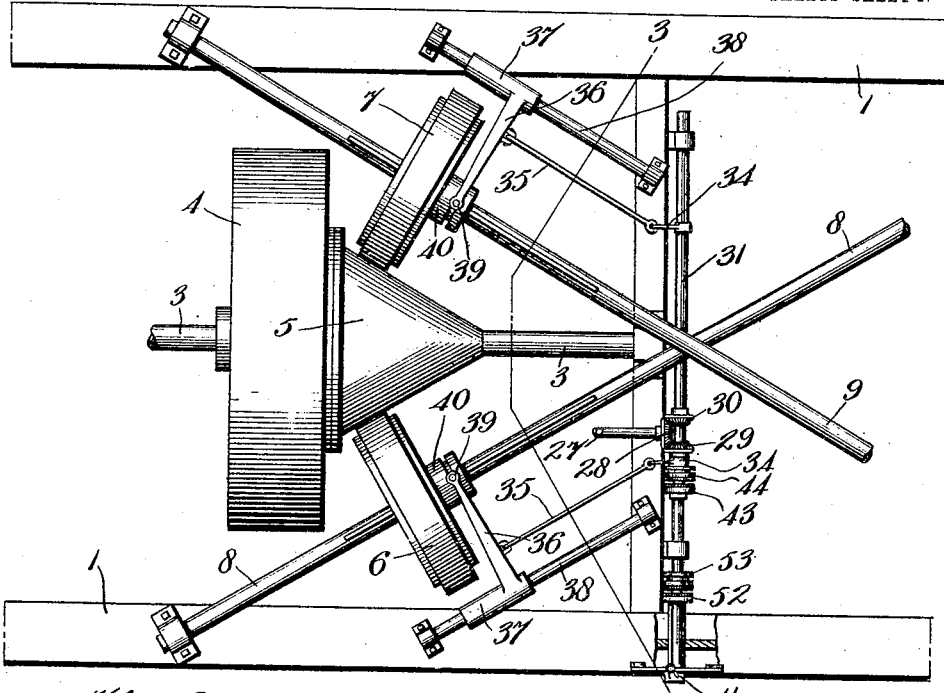
Figure 3:
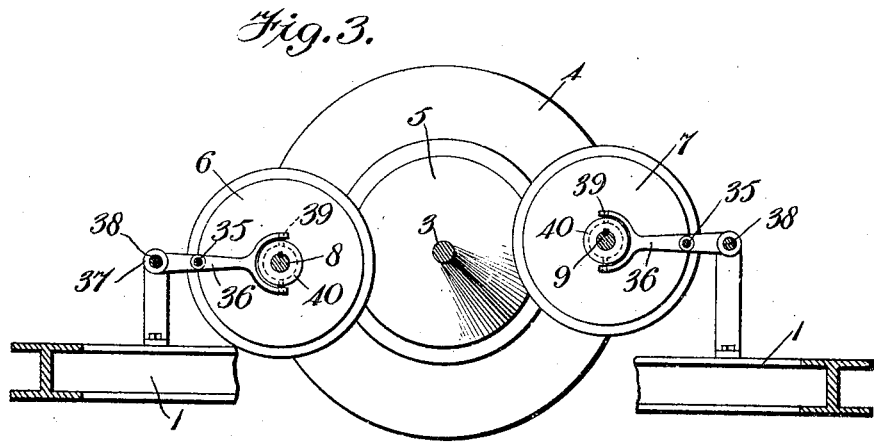

With these and other objects in view the invention consists in the arrangement and combination of parts hereinafter claimed, and while the invention is not restricted to the exact details shown and described, still, for the purpose of disclosure, reference is had to the accompanying drawing, in which like reference characters designate the same parts in the several views, and in which, Figure 1 is a top plan view illustrating the application of the invention, with certain parts omitted for clearness, to a vehicle; Fig. 2 is a top plan view of the cone and friction drive detail; Fig. 3 is a transverse sectional view of Fig. 2, taken on the line 3—3, thereof; Fig. 4 is a top plan view, partly in section, of the driving gear connection with the vehicle wheels; Fig. 5 is a view corresponding with Fig. 1 of a modified construction; Fig. 6 is a view corresponding with Fig. 2 of the construction shown in Fig. 5; Fig. 7 is a side elevational view, partly in section, of the steering apparatus and associated parts; Fig. 8 is a side elevational view, partly in section, of the gear shifting mechanism; Fig. 9 is a sectional view taken along line 9—9 of Fig. 8, looking in the direction of the arrows; and Fig. 10 is a detail view, partly in elevation and section, of the upper portion of the controlling lever and associated parts.

Referring to the construction in detail, 1 designates the chassis of a motor-driven vehicle, and 2 the motor therefor, whose driving shaft 3 is equipped with the usual fly-wheel 4 and a friction cone gear 5. A pair of friction gear wheels 6 and 7 are mounted respectively on driven shafts 8 and 9, which are journaled on the vehicle frame in angularly disposed or cross relation, as clearly shown in Figs. 1 and 2.

The shafts 8 and 9 are equipped respectively with cone pinions 10 and 11 meshing respectively with gears 12 and 60 that are secured to the halves 14 and 15 of the rear axle, said halves having fixed thereon, in the usual manner, the driving wheels 16 and 17 of the vehicle, and through the medium of which the car is driven when the gear elements are in that relation indicated in Fig. 1.

The friction gear wheels 6 and 7 are splined on their respective shafts 8 and 9, and are adapted to be moved in the same or opposite directions for imparting increased, decreased, or differential rotation to said shafts 8 and 9 from the cone gear 5, and the means for effecting which will now be described.

The differential control for imparting different speeds to the wheels 16 and 17 when the vehicle is turning is actuated through the steering mechanism (see Fig. 7), whose wheel 18 has a pinion 19 splined on the steering shaft 20, and said pinion 19 is adapted to be moved into or out of engagement with a similar pinion 21 by a manual control, consisting of a rod 22 having a fork 23 engaging with the grooved collar 24 of said pinion 19, and said rod 22 is actuated through a lever 25 fulcrumed on the tubular support 26 of the steering mechanism. The pinion 21 is secured on the shaft 27 and has on its opposite end a cone pinion 28 that is always in mesh with a pair of cone pinions 29 and 30, (see Figs. 1 and 8). The pinions 29 and 30 are mounted on a shaft 31 that is disposed transversely of the chassis 1, as indicated in Figs. 1 and 2, the pinion 30 being secured to said shaft, and the pinion 29 being keyed to a sleeve 33 that is free to rotate on said shaft. The sleeve 33 and shaft 31 are each provided with a projecting arm 34 (see Fig. 2), and said arms have link connections 35 that engage with arms 36 for shifting the friction wheels 6 and 7. Each of the arms 36 has a collar or sleeve portion 37 mounted to slide on its supporting bar 38 that is disposed parallel with its respective driven shaft 8 or 9; and said arms 36 have forked ends 39 engaging with grooved collars 40 that are secured to the friction wheels 6 and 7, as in the ordinary manner. With this arrangement it will be seen that the turning of the steering wheel 18 will, through the connections 19, 20, 21, 27 and 28, rotate the cone pinions 29 and 30 in opposite directions causing the arms 34 to move correspondingly, and said arms, in turn, will shift the respective friction gear wheels 6 and 7 toward and from the apex of the cone gear 5. The driven shafts 8 and 9 will then be rotated at different speeds, and the vehicle wheels 16 and 17 driven accordingly.

The manual means for shifting the gear wheels 6 and 7 simultaneously and in the same direction for effecting uniform speeds of the shafts 8 and 9 consists of a lever 41 fulcrumed on the shaft 31 and having a handle 42 that is within convenient reach of the driver. A clutch member 43 is rigid on the shaft 31, and is adapted to engage with a complementary clutch member 44 that is formed integral with the sleeve 33 that carries the arm 34. Said clutch member 44 is moved into and out of engagement with the clutch member 43, through the medium of a forked arm 45 that is secured to a sleeve 46, and said sleeve is, in turn, mounted to slide on a shaft 47 that is fixed on the lever 41, (see Figs. 8 and 9). The sleeve 46 is fitted with a stud 48 that engages with the arm 49 of a bell crank lever, which is fulcrumed on the lever 41, whose other arm 50 engages with the rod 51 that passes through the handle of the lever 41, as shown in Fig. 10. When the rod 51 is depressed, the bell crank lever (49 and 50) is actuated to shift the sleeve 46 and thus bring the clutch elements 43 and 44 into engagement when the shaft 31 may be turned through the swinging of the lever 41. This angular movement of the shaft 31 will swing the arm 34, carried by the sleeve 33, and shift its respective gear wheel engaging with the cone gear 5. A clutch member 52 is connected to be rotated by the lever 41, and is adapted to be engaged by a complementary clutch member 53 that is splined on the shaft 31. Said clutch member 53 is secured to the sleeve 46 by a forked arm 54, and adapted to be thrown into and out of engagement with the clutch member 52, as in that manner described of the clutch member 44. Through the engagement of the clutch elements 52 and 53 the shaft 31 is rotated and, in turn, rotates the arm 34 for shifting its respective friction wheel engaging with the cone gear 5.

With the mechanism just referred to, it will be readily seen that the swinging of the lever 41 will impart a like movement to the gear shifting arms 34, and that the friction wheels 6 and 7 will be moved simultaneously in the direction desired. The position to which the lever 41 is moved may be fixed through the medium of a quadrant rack 55, whose teeth are engaged by a pawl 56 that is carried by the rod 51, (see Fig. 9). Said rod 51 is normally held in its raised position through the medium of a spring 57 engaging with a movable collar 58, mounted on said rod, and a fixed member 59 secured to the lever 41. It will be understood that the steering gear control mechanism, shown in Fig. 7, will be thrown out of action when the manual controlled mechanism, shown in Fig. 8, is being used.

The means for effecting the reverse of travel of the vehicle consists of a pair of gears 13 and 60ª, (see Figs. 1, 4 and 5) that are formed integral with the sleeves or collars 61ª on which the gears 12 and 60 are mounted, and which are splined on the axle halves 14 and 15. Said gear wheels 13 and 60ª are adapted to be simultaneously thrown into engagement with the driving pinions 10 and 11, through the medium of a bell crank lever 61, whose arm 62 is connected by a rod 63 to a shaft 64 disposed transversely of the vehicle and which shaft is provided with a suitable manipulating lever 65 located within convenient reach of the driver. The other arm of said bell crank lever is connected to a bar 62ª that is mounted to slide in the side members of the chassis 1, and which has journaled therein the shafts 8 and 9, as clearly shown in Figs. 1 and 4. As the gear wheels 13 and 60ª are thrown into engagement with the pinions 10 and 11, the gear wheels 12 and 60 are, by the same operation, thrown out of engagement with said gear for obvious reasons.

The modified construction illustrated in Figs. 5 and 6 is substantially the same as that shown in the other figures described in the foregoing, with the exception that the cone gear 5 is extended more to the rear of the vehicle frame and has its position reversed to the end that the driven shafts 8ª and 9ª are of relatively shorter length than the corresponding shafts in the foregoing construction. This arrangement enables of a more even distribution of the weight of the gearing, and for which reason it may be preferred on certain types of cars. It will also be noted that in this construction a greater length of driving shaft 3ª is necessary. In all other respects, however, the arrangement and manner of operation is the same as that stated, with respect to the first-described construction.

It is obvious that those skilled in the art may vary the details of construction and arrangement of parts without departing from the spirit of my invention, and therefore I do not wish to be limited to such features except as may be required by the claims.

Having thus described my invention, what I claim as new and desire to protect by U. S. Letters Patent, is:

1. The combination with a motor-driven vehicle having a steering mechanism and a frictional driving gear wheel: of a pair of angularly disposed driven shafts having gearing connections with the vehicle driven wheels; shafts disposed adjacent and parallel to said driven shafts; arms mounted to slide on said second-named shafts; friction gear wheels splined on said first-named shafts and engaging with the driving friction wheel, said arms engaging with said splined gear wheels; a shaft disposed transversely of the vehicle; arms mounted to swing on said transversely disposed shaft; connections between said swinging arms and said first-named arms; pinions connected with said swinging arms; and gearing connections between said pinions and the steering mechanism automatically operable to move the swinging arms in opposite directions for imparting relatively different speeds to said driven shafts, substantially as described.

2. The combination with a motor-driven vehicle having a steering mechanism and a conical friction driving gear; of a pair of angularly disposed driven shafts journaled on the vehicle and having driving connection with the driven vehicle wheels; a pair of friction gear wheels splined on said driven shafts and engaging with said conical gear wheel; a shaft disposed transversely of the vehicle; a pair of pinions journaled on said transversely disposed shaft; an arm connected with each of said pinions; a pinion meshing with both of said pinions and adapted to rotate the same in opposite directions; gearing connections between said engaging pinion and the steering mechanism operable to automatically actuate said pinions for shifting said splined gear wheels in opposite directions to impart relatively different speeds to said driven shafts; and manually actuated means for swinging said arms in the same direction for shifting said splined gear wheels in the same direction to produce variable speeds of said driven shafts, substantially as described.

In testimony whereof I affix my signature in presence of two witnesses.

JASON C. SPARKS.

Witnesses:
D. VAN DONSELAAR,
F. A. BRENNORAN.